(12) United States Patent
Pauletti et al.

(10) Patent No.: US 6,788,130 B2
(45) Date of Patent: Sep. 7, 2004

(54) EFFICIENT CHARGE PUMP CAPABLE OF HIGH VOLTAGE OPERATION

(75) Inventors: Timothy P. Pauletti, Plano, TX (US); David Baldwin, Allen, TX (US); John H. Carpenter, Jr., Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/254,336

(22) Filed: Sep. 25, 2002

(65) Prior Publication Data
US 2004/0056707 A1 Mar. 25, 2004

(51) Int. Cl.[7] .............................................. G05F 03/02
(52) U.S. Cl. ......................... 327/536; 327/537; 363/59
(58) Field of Search ................................ 327/536, 537; 363/59

(56) References Cited

U.S. PATENT DOCUMENTS

| 5,029,282 A | * | 7/1991 | Ito ............................. 327/536 |
| 5,561,385 A | * | 10/1996 | Choi ........................... 327/536 |
| 5,672,992 A | * | 9/1997 | Nadd ........................... 327/390 |
| 6,157,242 A | | 12/2000 | Fukui |
| 6,194,954 B1 | * | 2/2001 | Kim et al. .................... 327/535 |
| 6,215,708 B1 | * | 4/2001 | Lien et al. ............. 365/189.09 |
| 6,456,151 B1 | * | 9/2002 | Pontarollo ................. 327/536 |
| 6,525,595 B2 | * | 2/2003 | Oku ............................ 327/536 |
| 2002/0130701 A1 | * | 9/2002 | Kleveland .................... 327/536 |

* cited by examiner

Primary Examiner—Terry D. Cunningham
(74) Attorney, Agent, or Firm—April M. Mosby; Wade James Brady, III; Frederick J. Telecky, Jr.

(57) ABSTRACT

A high voltage integrated circuit operable in a system having a low voltage reference, a high voltage reference, and a ground, for providing an output voltage higher than the high voltage reference. The integrated circuit includes a high voltage ground reference circuit, operable to provide a high voltage ground reference node. Also included is an oscillator, operable to provide a clock signal, the oscillator being connected to the high voltage reference and to the high voltage ground reference node. An isolated charge pump circuit is provided, operable to generate the output voltage and isolated in the integrated circuit from other circuitry.

6 Claims, 3 Drawing Sheets

EFFICIENT CHARGE PUMP CAPABLE OF HIGH VOLTAGE OPERATION

TECHNICAL FIELD OF THE INVENTION

This invention relates to charge pump circuits, and more particularly relates to charge pump circuits capable of high voltage operation.

BACKGROUND OF THE INVENTION

The charge pump is a type of DC-DC voltage converter circuit that uses capacitors to store and transfer energy, typically in order to generate a higher voltage than that supplied to the circuit. They are used in a variety of applications. They are commonly used, for example, to generate the higher voltages required for the writing and erasing operations of non-volatile memories such as flash memories. They are also used to achieve higher gate drive voltages (Vgs) on MOSFETs to obtain a lower resistance from drain-to-source while the device is on (Rdson) for a same size device. They are also used as a supply in low voltage applications. The foregoing list of applications is not exhaustive.

A charge pump is typically constructed in a series of stages that step up the voltage created by the charge stored in one stage to a higher voltage in the next. FIG. 1 is a circuit diagram of an exemplary prior art two-phase charge pump circuit 10. The circuit includes metal oxide semiconductor field effect transistors ("MOSFETs," or, simply "FETs") T1–T12, capacitors C1–C6, and an inverter, connected as shown. The circuit has three identical stages 14, 15, 16, each stage including four FETs (T1–T4, T5–T8 and T9–T12, respectively), and two capacitors (C1 & C2, C3 & C4 and C5 & C6, respectively), connected as shown. A high voltage $V_H$ is provided to the first stage 14, while a square wave clock signal CLK is provided to one side of all stages, and its inverse, generated by inverter 12, is provided to the other side of all stages, as shown.

Each stage operates in similar manner, with increasing voltage being provided successively at the output of each stage, in a manner well known in the art. Thus, in successive half cycles of CLK, FETs T1–T12 operate in complementary fashion to pump charge onto the plates of capacitors C1–C6, creating a voltage across the capacitors, and then to use that voltage, which is raised during the transfer cycle by the voltage of the clock signal, to elevate the voltage across a capacitor in a next stage that is on the same side of the circuit by that voltage, less the threshold voltage of a connecting FET. The last stage provides an output voltage $V_{OUT}$.

However, as the voltage generated by each stage increases, the threshold voltages of the transferring FETs can increase, due to the well-known backgating effect. This causes a successively lower voltage increase from one stage to the next. In fact, the threshold voltage of a transferring FET can become the same as the voltages of the clock signals driving the pump, at which point no further boosting is possible. To avoid this, in the charge pump circuit 10 the backgate is tied to the source on each FET, as shown. Thus, Vsb=0. This requires isolation of the circuit.

In addition, there is a significant challenge in designing a charge pump that can work over a large voltage range. One reason for this is that the charge pump voltage is usually referenced to the supply in some way, and as the supply voltage increases so too does $V_{OUT}$. However, the capacitors are typically diffusion capacitors, which have a specific voltage tolerance. When the clock signal switches from the supply voltage in its high phase to a low voltage in its low phase, the voltage tolerance of a capacitor can be exceeded, causing breakdown of the capacitor. Thus, in designing a high voltage charge pump that can work over a very wide supply range, one must solve the problem of how to clock it, but not exceed the voltage tolerance of the capacitors.

U.S. Pat. No. 6,157,242, which issued on Dec. 5, 2000, to Haruyasu Fukui, et al., and was assigned to Sharp Kabushiki Kaisha, proposes a charge pump circuit arrangement to allow operation at a wide range of power supply voltages. In their scheme, normal clock signals are provided to early stages of a charge pump, but in order to overcome the problem associated with increasing transferring FET threshold voltage, and thus allow a higher output voltage to be generated, a clock signal boost circuit is provided for boosting voltages of the clock signals of later stages. In order to address the problem of having the charge pump work over a very wide range and still stay within the tolerances of the capacitors, they propose having their clock boosting capable of being enabled and disabled. For lower supply voltages, clock boosting would be enabled, while for higher supply voltages clock boosting would be disabled, to protect the capacitors against breakdown. However, this proposed solution provides a limited output voltage.

Another prior art solution, shown in FIG. 2, utilizes a conventional ring oscillator 17, with transfer circuitry 17a providing the oscillator signal to high voltage level shifters 18 to raise both the high and low voltage levels of the clock signals CLK and $\overline{CLK}$, in order to provide a higher output voltage, and using high voltage components in the charge pump (not shown). In this solution, high voltage references $V_{H1}$ and $V_{H2}$ are referenced linearly to supply, and provided to the level shifters, as shown. For example, $V_{H1}$ could be at supply voltage, Vsupply, such as 5 volts, and $V_{H2}$ at some specified voltage below Vsupply, with both rising and falling with Vsupply, but holding the difference in their voltages to close tolerance. While this solution does not limit the output voltage, as in the arrangement disclosed in U.S. Pat. No. 6,157,242, it does require a relatively large integrated circuit area to implement, as it requires the additional area for the level shifters, and for high voltage components used in the design. In addition, the approach shown in FIG. 2 is limited in clocking frequency because of the high voltage level shifters 18. The FET devices in that circuit are, of necessity, large and have high intrinsic capacitance, and so do not switch rapidly.

SUMMARY OF THE INVENTION

In accordance with the present invention there is provided a high voltage integrated circuit operable in a system having a low voltage reference, a high voltage reference, and a ground, for providing an output voltage higher than the high voltage reference. The integrated circuit includes a high voltage ground reference circuit, operable to provide a high voltage ground reference node. Also included is an oscillator, operable to provide a clock signal, the oscillator being connected to the high voltage reference and to the high voltage ground reference node. An isolated charge pump circuit is provided, operable to generate the output voltage and isolated in the integrated circuit from other circuitry.

These and other features of the invention will be apparent to those skilled in the art from the following detailed description of the invention, taken together with the accompanying drawings.

DETAILED DESCRIPTION OF THE PREFERRED EMBODIMENT

The numerous innovative teachings of the present invention will be described with particular reference to the presently preferred exemplary embodiments. However, it should be understood that this class of embodiments provides only a few examples of the many advantageous uses and innovative teachings herein. In general, statements made in the specification of the present application do not necessarily delimit the invention, as set forth in different aspects in the various claims appended hereto. Moreover, some statements may apply to some inventive aspects, but not to others.

Figure 1:
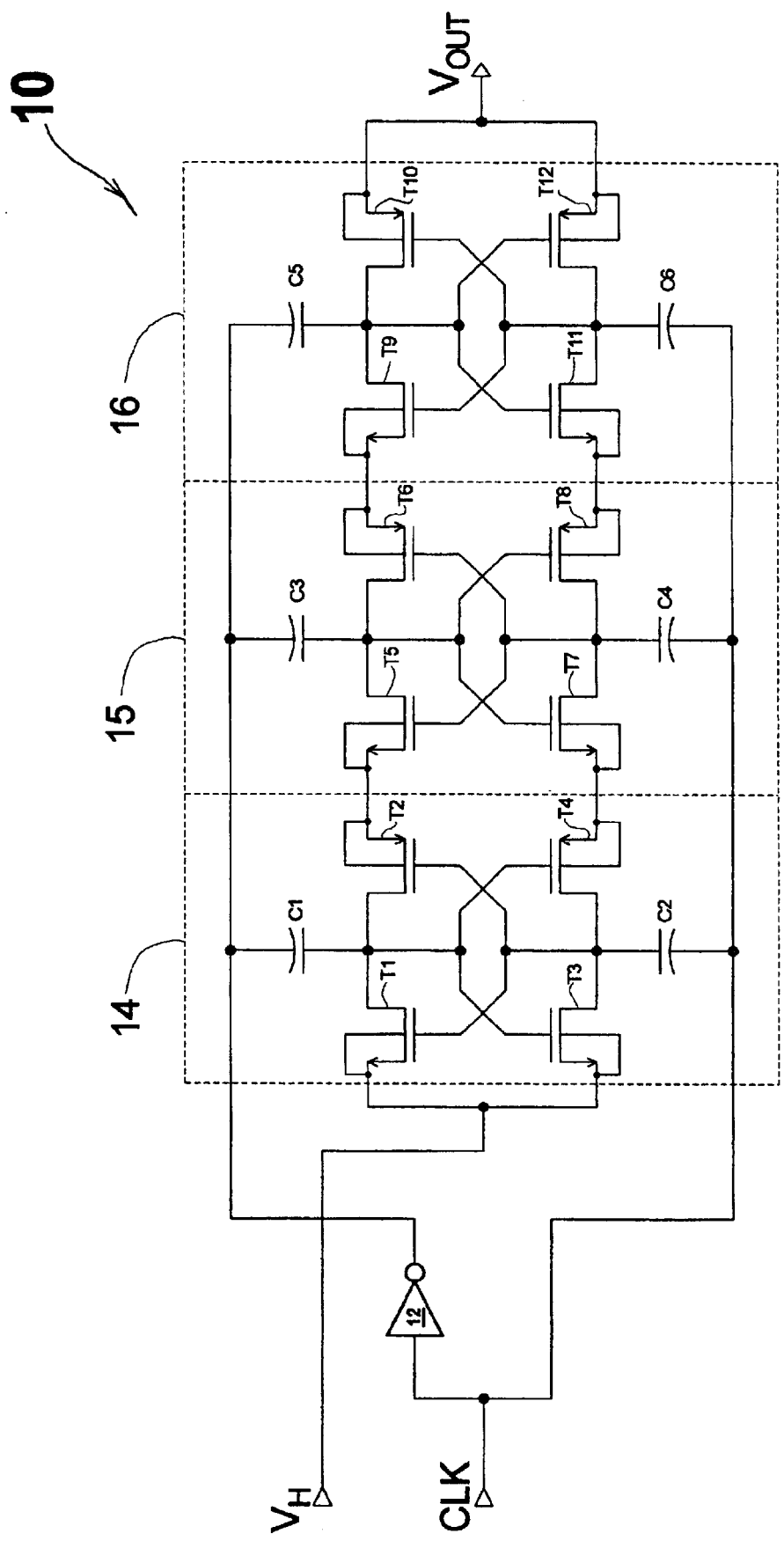
FIG. 1 is a circuit diagram of a prior art charge pump.
Figure 2:
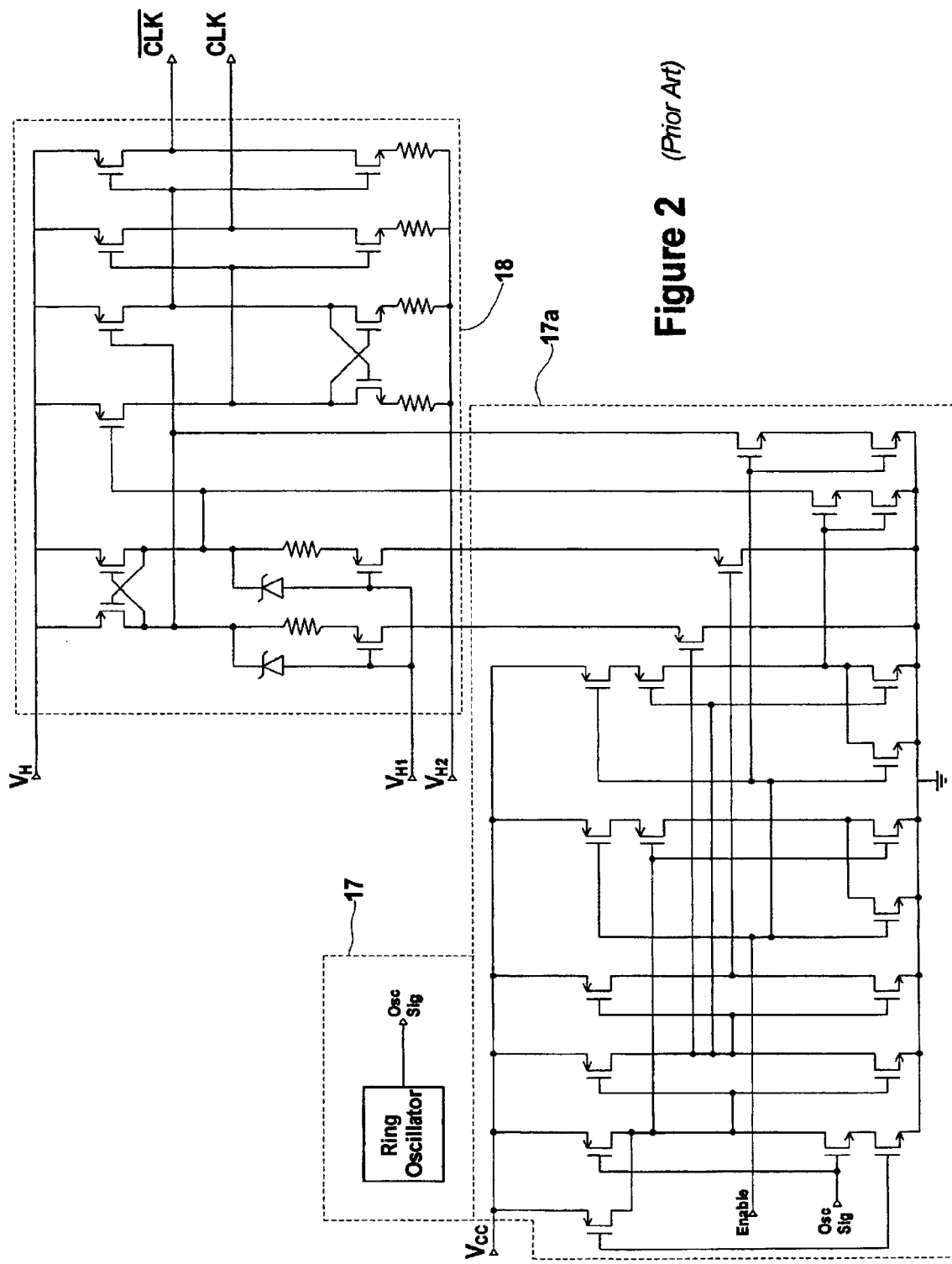
FIG. 2 is a circuit diagram of a prior art circuit that generates a clock signals for a charge pump, at elevated voltages.
Figure 3:
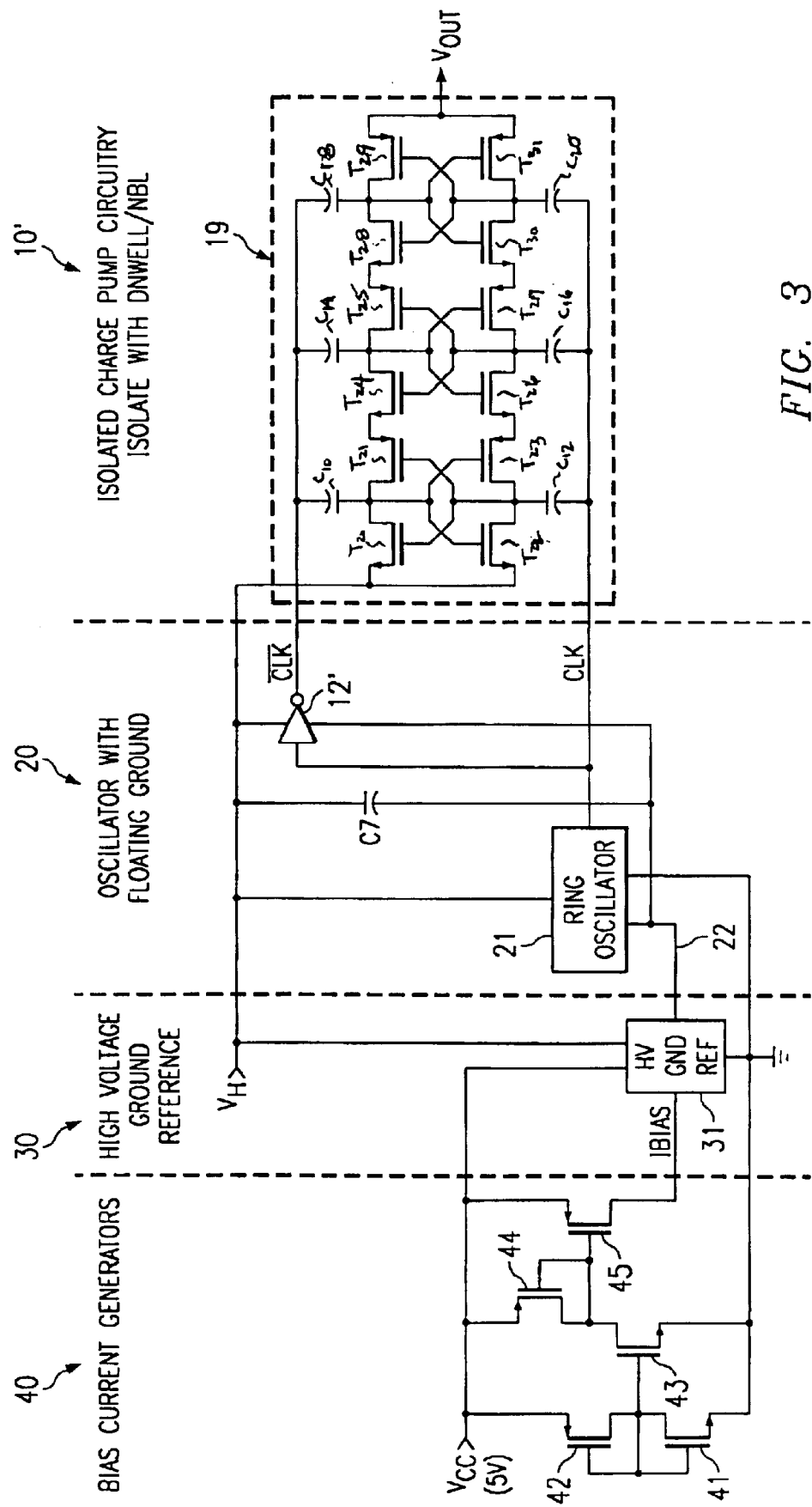
FIG. 3 is a diagram of a preferred embodiment of the present invention.

FIG. 3 is diagram of a preferred embodiment of the present invention. In general, to solve the problems described above, a ring oscillator circuit 21 providing the CLK signal has its "ground," or, reference voltage regulated so that it is always a constant and operational voltage between the supply voltage and the actual circuit ground. In order to protect the circuitry of the charge pump, it is placed in a deep N-well ring ("DNWELL") 19 over an N-type buried layer ("NBL"), using known fabrication techniques, resulting in an isolated charge pump circuit 10'. By providing a ring oscillator with floating ground and isolated charge pump circuit, the circuit area required is significantly reduced as compared with prior art solution described above, since no high voltage components are required, and no level shifters are required. In addition, there is significantly reduced current consumption, as compared with prior art solutions. Further, from a product design standpoint, less risk is involved with implementations of the present invention, since the circuit is simpler, compared with prior art solutions achieving the same or similar result.

Specifically, the circuit of FIG. 3 includes the isolated charge pump circuit 10', an oscillator stage with floating ground 20, a high voltage ground reference stage 30, and a bias generator stage 40. The bias generator stage 40 uses FETs 41 and 42 to establish a voltage reference with respect to $V_{CC}$ ($V_{CC}$ being, for example, 5 volts), and then uses that voltage to establish a reference current through FET 43, which is mirrored using a current mirror constructed of FETs 44 and 45, to generate a current bias, ibias.

The high voltage ground reference stage 30 comprises a block of circuitry 31 that takes an integrated circuit high voltage source $V_H$, and generates a floating ground on node 22, which is provided to ring oscillator circuit 21 and to inverter 12'. The high voltage $V_H$ is typically a readily available high voltage supply, for example a car battery voltage of approximately 12–14 volts, for applications intended for use in an automobile. Another example is in applications intended for use in a printer. Printers typically transform and regulate a 30 volt supply to control the motors that move the print heads. Other supply sources exist, depending on the application. In any event, $V_H$ is higher than normal supply voltage.

Preferably, circuit 31 is an operational amplifier configured as a voltage regulator, that outputs a voltage that stays within a range of the supply voltage, for example 5 volts. It will be appreciated that the invention is not limited to the use of circuitry 31, but that any circuit that provides a node, such as node 22, that has a constant and operational voltage between $V_H$ and ground may be used to provide this function.

The oscillator circuit that is used in oscillator stage 20 is a conventional ring oscillator 21. It will be appreciated that the invention is not limited to the use of ring oscillator 21, but that any circuit that generates a suitable clock signal may be used to provide this function. Preferably, however, the ring oscillator 21 is constructed of PMOS type FET devices such that they are self-isolating. That is, in a p-type substrate technology they are designed to reside in an n-type tank that, in turn, resides in a p-epi layer. The purpose of the ground connection to the ring oscillator 21 is to provide the substrate connection of the PMOS devices in such an implementation. The use of $V_H$ and the floating ground voltage on node 22 result in a CLK signal that changes essentially between those two voltages.

Inverter 12' is essentially the same construction as prior art inverter 12, but it has the floating ground connection 22 for its ground connections. It takes the high voltage CLK signal as an input and provides the inverse $\overline{CLK}$ signal as an output, again changing between $V_H$ and the floating ground voltage on node 22.

Now, the high voltage ground reference circuitry 31 preferably has high gain, in order to sink the switching current of the ring oscillator circuit 21 and still maintain solid regulation. Therefore, as a practical matter, node 22 will have some ripple on it. Capacitor C7 is provided to filter that ripple. In the preferred embodiment, capacitor C7 is provided between $V_H$ and node 22, rather than, for example, between node 22 and ground. This is because as so connected, capacitor C7 forms a high frequency bypass for the oscillator supply. This supply is comprised of the $V_H$ rail and the virtual reference ground node 22. In addition, the voltage between $V_H$ and node 22 is a regulated low voltage, and as such it allows a higher density capacitor to be placed there, as compared with a connection between node 22 and ground. Finally, any supply transients coupled to $V_H$ will be transferred to node 22 by way of capacitor C7, so that the transient appears as a common-mode signal. Hence, the differential supply voltage across the oscillator will remain constant, reducing the likelihood of damage to that component. If capacitor C7 is connected between node 22 and ground it would actually increase the likelihood that damage would occur due to transients induced on $V_H$.

In this way, ring oscillator circuit 21 and inverter 12' operate between the floating ground on line 22 and the high voltage reference $V_H$. Thus, the CLK signal and its inverse $\overline{CLK}$ are provided to the isolated charge pump circuit 10' at a higher voltage, allowing a higher $V_{OUT}$, while by the DNWELL/NBL isolation, the low voltage components in isolated charge pump circuit 10' are protected against breakdown.

Although the present invention and its advantages have been described in detail, it should be understood that various changes, substitutions and alterations can be made herein without departing from the spirit and scope of the invention as defined by the appended claims.

What is claimed is:

1. A high voltage integrated circuit operable in a system having a low voltage reference, a high voltage reference, and a ground, for providing an output voltage higher than the high voltage reference, comprising:

a bias current generator stage coupled to receive the low voltage reference to generate a bias current;

a high voltage ground reference circuit coupled to receive the bias current, the low voltage reference, the high voltage reference and ground, the high voltage ground reference circuit operable to provide a high voltage ground reference node;

an oscillator, operable to provide a clock signal, the oscillator being connected to the high voltage reference and to the high voltage ground reference node; and an isolated charge pump circuit coupled to receive the clock signal, the high voltage reference and an inverted clock signal, the isolated charge pump circuit operable to generate the output voltage.

2. A high voltage integrated circuit as in claim 1, wherein the high voltage ground reference circuit comprises an operational amplifier.

3. A high voltage integrated circuit as in claim 1, wherein the oscillator comprises a ring oscillator including PMOS FET devices in an n-type tank residing in a p-epi layer.

4. A high voltage integrated circuit as in claim 1, wherein the bias current generator stage, comprises:

a first transistor, having a gate node, a source node and a drain node, the source node coupled to receive the low voltage reference;

a second transistor, having a gate node, a source node and a drain node, the gate node coupled to the gate node of the first transistor, the drain node coupled to the drain node of the first transistor, the source node coupled to the ground;

a third transistor, having a gate node, a source node and a drain node, the gate node coupled to the gate node of the first transistor, the source node coupled to the ground; and a current mirror coupled between the drain node of the third transistor and the low voltage reference.

5. A high voltage integrated circuit as in claim 1, wherein the oscillator, comprises:

a ring oscillator coupled to receive the high ground voltage reference, ground, and the high voltage reference to provide a clock signal;

a capacitor coupled across the high voltage reference and the high ground voltage reference; and an inverter coupled to the ring oscillator to provide an inverted clock signal, wherein the inverter having a first and second control input coupled to receive the high ground voltage reference and the high voltage reference.

6. A high voltage integrated circuit as in claim 1, wherein the isolated charge pump circuit, comprises:

at least one stage that comprises, a first transistor, having a control node, a drain node and a source node, the source node coupled to receive the high voltage reference, a second transistor, having a control node, a drain node and a source node, the control node of the first transistor coupled to the control node of the second transistor, the drain node of the first transistor coupled to the drain node of the second transistor, a third transistor, having a control node, a drain node and a source node, the source node coupled to receive the high voltage reference, the drain node coupled to the control node of the first transistor, the drain node of the first transistor coupled to the control node of the third transistor, and a fourth transistor, having a control node, a drain node and a source node, the control node of the third transistor coupled to the control node of the fourth transistor, the drain node of the third transistor coupled to the drain node of the fourth transistor, a first capacitor coupled between the drain node of the first transistor and the inverted clock signal node, a second capacitor coupled between the drain node of the third transistor and the clock signal node wherein each of the at least one stages couples to one preceding stage.

* * * * *